United States Patent
Oishi

(10) Patent No.: US 8,966,504 B2
(45) Date of Patent: Feb. 24, 2015

(54) INFORMATION PROCESSING APPARATUS, ELECTRICAL POWER CONTROL METHOD, AND COMPUTER PRODUCT

(71) Applicant: Fujitsu Limited, Kawasaki-shi, Kanagawa (JP)

(72) Inventor: Ryosuke Oishi, Kunitachi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/916,055

(22) Filed: Jun. 12, 2013

(65) Prior Publication Data
US 2013/0276001 A1      Oct. 17, 2013

Related U.S. Application Data

(63) Continuation of application No. PCT/JP2010/072403, filed on Dec. 13, 2010.

(51) Int. Cl.
G06F 3/00       (2006.01)
G06F 1/14       (2006.01)
G06F 9/46       (2006.01)
G06F 9/54       (2006.01)
G06F 9/48       (2006.01)
G06F 1/32       (2006.01)

(52) U.S. Cl.
CPC .............. *G06F 9/542* (2013.01); *G06F 9/4893* (2013.01); *G06F 1/3212* (2013.01); *G06F 1/329* (2013.01); *Y02B 60/144* (2013.01)
USPC ............................ 719/318; 718/104; 713/502

(58) Field of Classification Search
CPC ..... H04L 12/18; H04L 12/1895; G06F 1/329; G06F 8/65; G06F 1/3243
See application file for complete search history.

(56) References Cited

U.S. PATENT DOCUMENTS

| 6,807,159 | B1 | 10/2004 | Shorey et al. |
| 2002/0144167 | A1 | 10/2002 | Kobayashi et al. |
| 2002/0174371 | A1* | 11/2002 | Padawer et al. ............... 713/320 |
| 2005/0085279 | A1 | 4/2005 | Aoki |
| 2006/0026597 | A1* | 2/2006 | Sakou ........................... 718/100 |

(Continued)

FOREIGN PATENT DOCUMENTS

| JP | 7-168726 | 7/1995 |
| JP | 9-205396 | 8/1997 |

(Continued)

OTHER PUBLICATIONS

International Preliminary Report on Patentability with English Translation mailed Jun. 27, 2013 in corresponding International Application No. PCT/JP2010/072403.

(Continued)

*Primary Examiner* — Tuan Dao
(74) *Attorney, Agent, or Firm* — Staas & Halsey LLP

(57) ABSTRACT

An information processing apparatus includes a processor programmed to detect scheduled starting times of two events to be executed at a current time or thereafter; calculate a difference of the scheduled starting times of the two events, when the scheduled starting times of the two events have been detected; and correct, based on the calculated difference and to an extent that a restriction indicated in restriction information of an event to be corrected is observed, the scheduled starting time of at least any one of the two events, as the event to be corrected, such that an interval between the scheduled starting times of the two events is shortened.

7 Claims, 10 Drawing Sheets

(56) References Cited

U.S. PATENT DOCUMENTS

2008/0148273 A1* 6/2008 Huang et al. .................. 718/104
2008/0155563 A1* 6/2008 Nakamura .................... 719/318
2009/0083752 A1 3/2009 Wu et al.
2009/0307519 A1* 12/2009 Hyatt ........................... 713/502

FOREIGN PATENT DOCUMENTS

| JP | 2002-185475 | 6/2002 |
| JP | 2002-222033 | 8/2002 |
| JP | 2004-13235 | 1/2004 |
| JP | 2005-33444 | 2/2005 |
| JP | 2005-115620 | 4/2005 |
| JP | 2005-130456 | 5/2005 |
| JP | 2005-242631 | 9/2005 |
| JP | 2007-299283 | 11/2007 |
| JP | 2008-242614 | 10/2008 |
| JP | 2009-75808 | 4/2009 |
| JP | 2010-220156 | 9/2010 |
| JP | 2010-244202 | 10/2010 |

OTHER PUBLICATIONS

Japanese Office Action mailed Nov. 5, 2013 in corresponding Japanese Application No. 2012-548560.
International Search Report mailed Jan. 11, 2011 corresponding to International Application No. PCT/JP2010/072403.

* cited by examiner

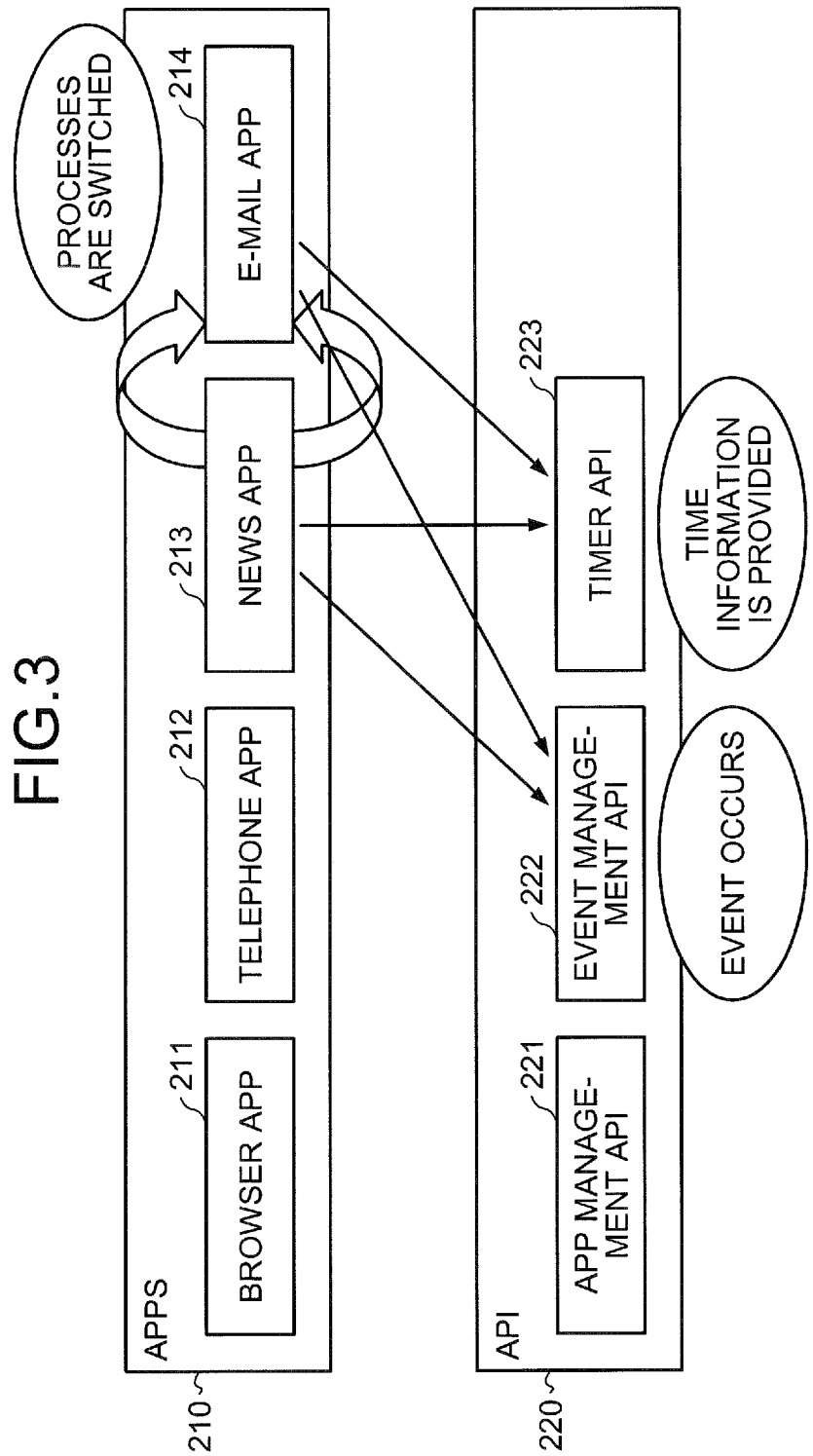

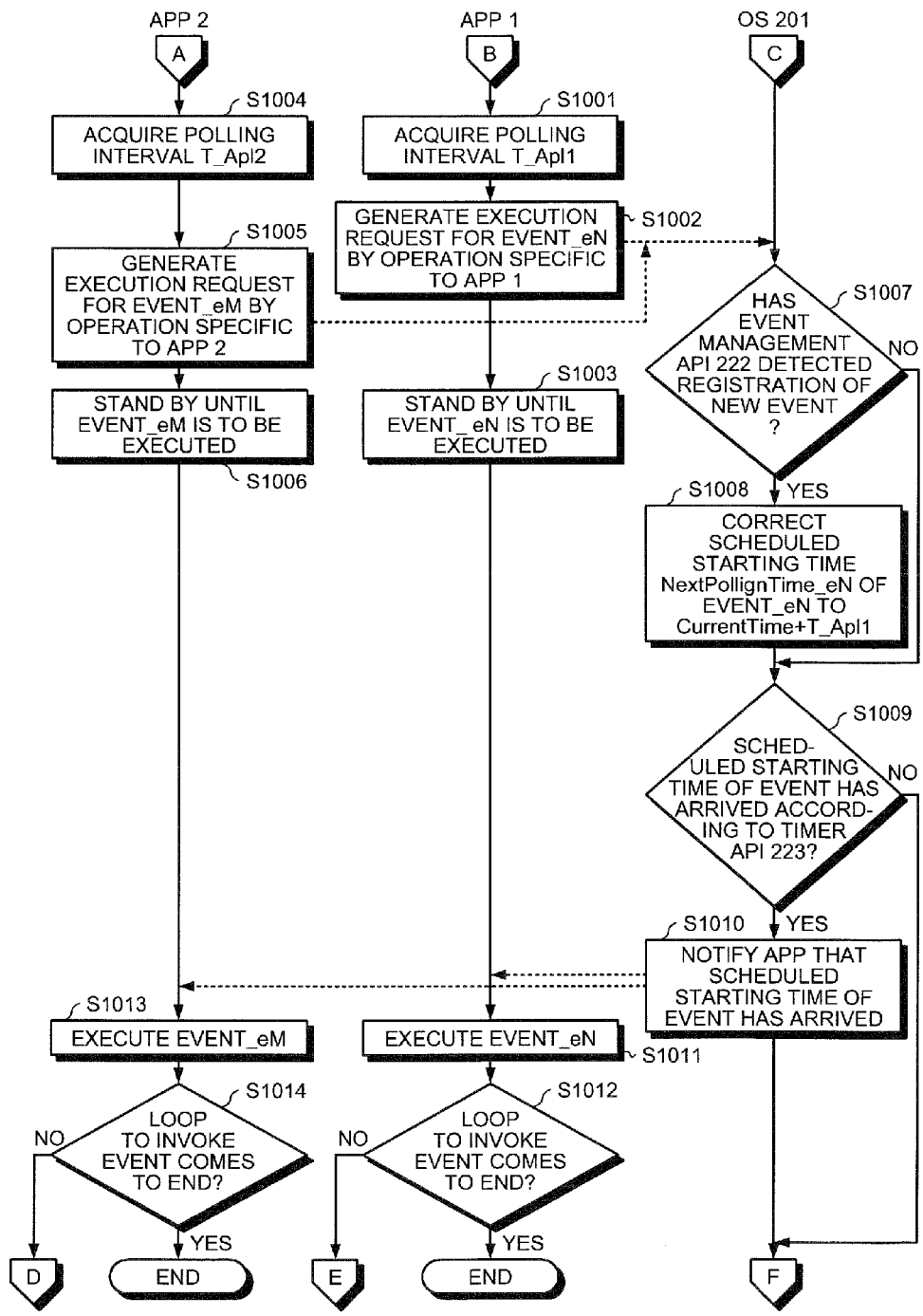

INFORMATION PROCESSING APPARATUS, ELECTRICAL POWER CONTROL METHOD, AND COMPUTER PRODUCT

CROSS REFERENCE TO RELATED APPLICATIONS

This application is a continuation application of International Application PCT/JP2010/072403, filed on Dec. 13, 2010 and designating the U.S., the entire contents of which are incorporated herein by reference.

FIELD

The embodiments discussed herein are related to an information processing apparatus, an electrical power control method, and a computer product.

BACKGROUND

Among mobile terminal apparatuses such as mobile telephones and personal digital assistants (PDAs), those configured to include a multi-task operating system (OS) are increasing. Among mobile terminal apparatuses equipped with a multi-task OS is an apparatus that has improved functions as well as improved expressional capability and operability of the user interface, and to which rich client software can be added. The mobile terminal apparatus also has various functions other than making and receiving calls, and provides the various functions to the user by executing applications (hereinafter, respectively referred to as "app") such as, for example, an e-mail app; a web browser; a news app; a viewing app for blogs, etc.; a map app; a traffic information app; and a game app.

The mobile terminal apparatus providing the various functions as described above consumes more electrical power as the number of functions provided increases. For example, a smartphone is an example of a mobile terminal apparatus equipped with a multi-task OS, and also consumes a large amount of electrical power. The functions provided by a smartphone include functions that cause the hardware thereof to operate and the software thereof to be executed consequent to regularly executed processes such as the reception of e-mail and updating of a resource description framework site summary (RSS) even when the user does not operate the smartphone. These functions cause the power consumption of the mobile terminal apparatus to be further increased.

For example, a technique is disclosed as a technique of reducing the increased power consumption. According to the technique, information such as the amount of remaining battery power is mutually declared between a wireless terminal apparatus and a server; the transmission speed, the transmission scheme, and the power source control scheme are set according to the content of the declaration; and thereby, the reduction of the amount of remaining battery power is minimized (see, e.g., Japanese Laid-Open Patent Publication No. H9-205396).

A technique is disclosed as another technique of reducing the power consumption. According to the technique, the arrival time of a packet is estimated; an active state where the electrical power is unlimitedly used is switched to a low electrical power state or the low electrical power state is switched to the active state, based on the estimated arrival time (see, e.g., Japanese Laid-Open Patent Publication No. 2002-185475).

A technique is disclosed as yet another technique of reducing the power consumption. According to the technique, in a wireless communication system, the transmission cycle of a beacon signal that is reported by a base station is set based on a setting request issued by a terminal station (see, e.g., Japanese Laid-Open Patent Publication No. 2005-130436 (Paragraphs and)). According to the technique disclosed in Japanese Laid-Open Patent Publication No. 2005-130436, the terminal station can turn off the power supply to the communication circuit until the timing at which the beacon signal is received by causing the interval for checking an e-mail app executed in the terminal station to be same as the transmission cycle of the beacon of the base station and thereby, the power consumption of the terminal station can be reduced.

A technique is disclosed as a technique of reducing the amount of information in regularly executed processes. According to the technique, the polling time of a packet from a parent station is calculated by a child station based on a database (see, e.g., Japanese Laid-Open Patent Publication No. 2005-33444).

However, among the conventional techniques, according to the technique disclosed in Japanese Laid-Open Patent Publication No. 2002-185475, the amount of data transmitted and received by the mobile terminal apparatus is estimated based on the result of observation and therefore, a problem arises in that the power consumption is increased when a large amount of data is generated. According to the techniques disclosed in Japanese Laid-Open Patent Publication Nos. H9-205396, 2002-185475, and 2005-33444, the apps providing the various functions do not necessarily operate within the extent that is estimated by the mobile terminal apparatus and each of the apps operate independently of the other apps and therefore, a problem arises in that power consumption increases.

According to the technique disclosed in Japanese Laid-Open Patent Publication No. 2005-130436, denoting the transmission process executed by the base station as "app 1" and the check process of the e-mail app executed by the terminal station as "app 2", the technique disclosed in Japanese Laid-Open Patent Publication No. 2005-130436 is applicable to a mobile terminal apparatus and the app 1 can be run associated with the operation of the app 2. However, a problem arises in that the operation restrictions of the apps may be violated by changing the time at which each of the apps runs.

SUMMARY

According to an aspect of an embodiment, an information processing apparatus includes a processor programmed to detect scheduled starting times of two events to be executed at a current time or thereafter; calculate a difference of the scheduled starting times of the two events, when the scheduled starting times of the two events have been detected; and correct, based on the calculated difference and to an extent that a restriction indicated in restriction information of an event to be corrected is observed, the scheduled starting time of at least any one of the two events, as the event to be corrected, such that an interval between the scheduled starting times of the two events is shortened.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram of a case where apps 210 are caused to run at polling intervals corrected by an event management API 222;

FIG. 10 is a flowchart (Part II) of the polling interval correction process.

DESCRIPTION OF EMBODIMENTS

Embodiments of an information processing apparatus, an electrical power control method, and an electrical power control program will be described in detail with reference to the accompanying drawings. In the present embodiments, a mobile terminal apparatus will be described as one example of information processing.

Figure 1:
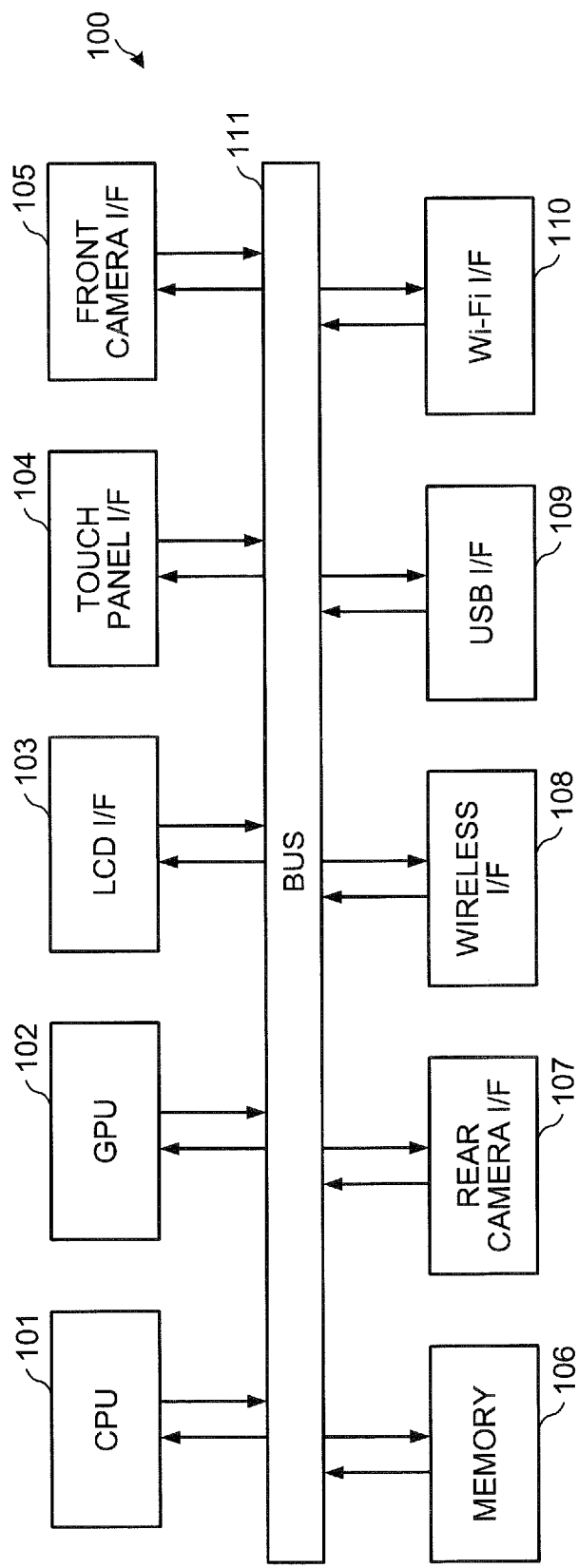
FIG. 1 is a block diagram of hardware of a mobile terminal apparatus 100 according to an embodiment.

FIG. 1 is a block diagram of hardware of the mobile terminal apparatus 100 according to the embodiment. The mobile terminal apparatus 100 includes a central processing apparatus (CPU) 101 and a graphics processing unit (GPU) 102 and further includes a liquid crystal display (LCD) I/F 103, a touch panel I/F 104, a front camera I/F 105, memory 106, a rear camera I/F 107, a wireless I/F 108, a universal serial bus (USB) I/F 109, and a wireless fidelity (Wi-Fi) I/F 110.

FIG. 1 does not depict apparatuses that are connected through the I/Fs from the LCD I/F 103 to the front camera I/F 105 and the rear camera I/F 107 to the Wi-Fi I/F 110. The components from the CPU 102 to the Wi-Fi I/F 110 are connected to each other by a bus 111, and can each mutually transmit and receive data under the management by the CPU 101.

The CPU 101 supervises the control of operations of the entire mobile terminal apparatus 100. The CPU 101 may be a multi-core processor that has plural cores. The GPU 102 executes calculation processes that are specific to graphic processing. The LCD I/F 103 is an I/F with an LCD display. The LCD display displays data such as a document, an image, and function information in addition to a cursor, an icon, and a tool box. The touch panel I/F 104 is an I/F with a touch panel. For example, when the user presses down on the touch panel, the touch panel I/F 104 interprets the pressing down as occurrence of an event and notifies the CPU 101 accordingly.

Each of the front and the rear camera I/Fs 105 and 107 is an I/F with a camera. The memory 106 are a main storage device and a sub storage device. For example, the memory 106 are storage devices such as a read-only memory (ROM), a random access memory (RAM), and a flash ROM. The ROM stores programs such as a boot program. The RAM is used as a work area for the CPU 101. The flash ROM stores system software such as an OS, application software, and images, moving images, etc. captured by the front and the rear cameras.

The wireless I/F 108 is an I/F with wireless devices such as an antenna. The USB I/F 109 is an I/F with peripherals that support the USB standard. The peripherals can be, for example, storage media such as a flash memory such as "3D card (a registered trademark)". The Wi-Fi I/F 110 is an I/F with a wireless LAN device that supports "IEEE 802.11a/ IEEE 802.11b" that are the standard specifications for the wireless LAN.

Figure 2:
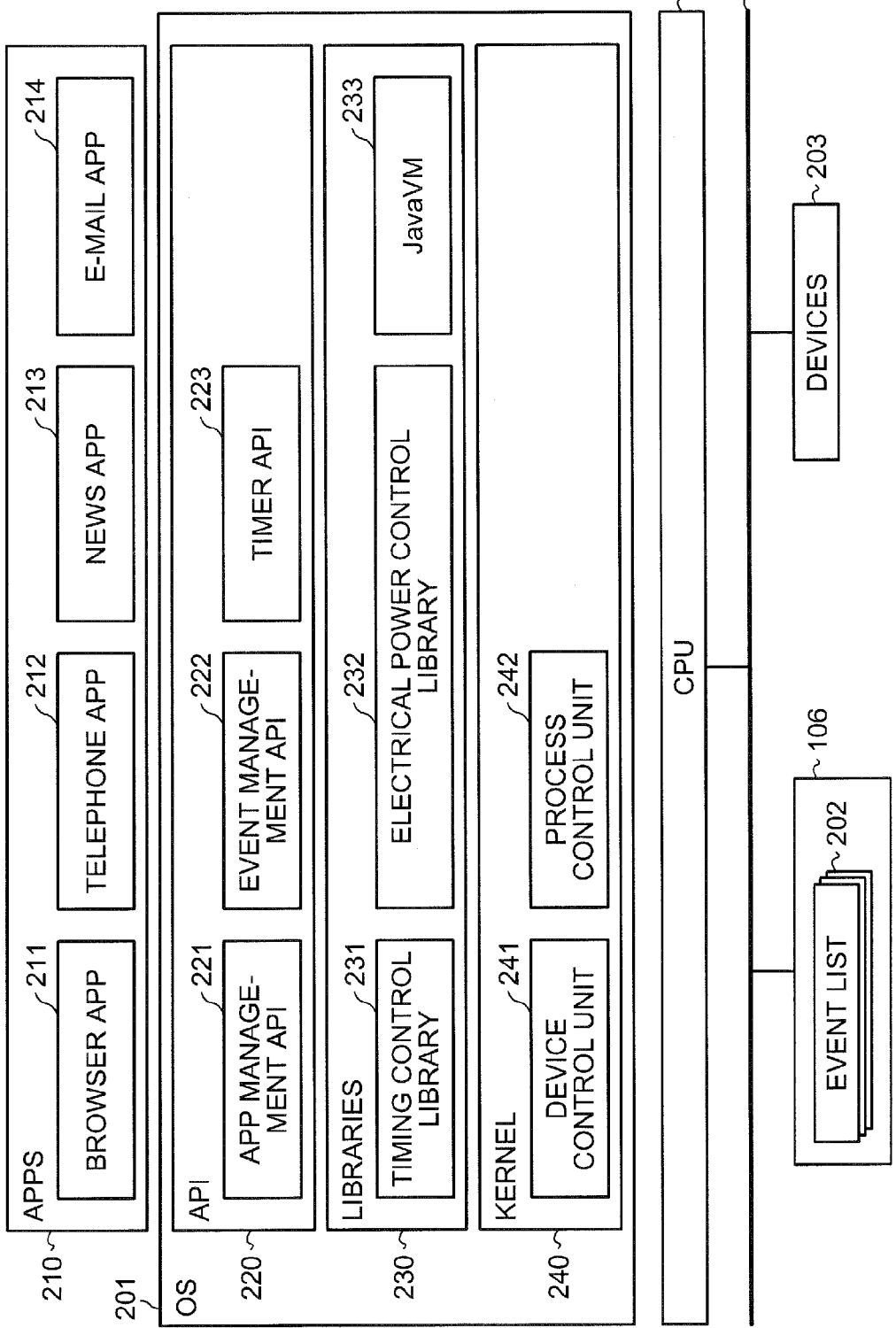
FIG. 2 is a block diagram of software of the mobile terminal apparatus 100.

FIG. 2 is a block diagram of software of the mobile terminal apparatus 100. The mobile terminal apparatus 100 includes apps 210, an application program interface (API) 220, libraries 230, and a kernel 240. The software from the API 220 to the kernel 240 is software provided by an OS 201.

The apps 210 include a browser app 211, a telephone app 212, a news app 213, an e-mail app 214, etc. The browser app 211 is an app that executes communication through the Wi-Fi I/F 110, etc. and that is used to view mainly web pages acquired based on a hypertext transfer protocol (HTTP). The telephone app 212 is an app that is connected to a base station by the wireless I/F 108 and that is used to make and receive calls with respect to other mobile terminal apparatuses, a physical-line telephone, etc. The news app 213 is an app that executes communication through the Wi-Fi I/F 110, etc. and that is used to view on the Internet, news acquired based on a network news transfer protocol (NNTP).

The e-mail app 214 is an app that executes communication through the Wi-Fi I/F 110, etc. and that is used to transmit and receive e-mail based on a simple mail transfer protocol (SMTP), a post office protocol (POP), etc. It is assumed that the apps 210 according to the embodiment are each executed as one process. For example, the browser app 211 is one process and the telephone app 212 is another one process.

The API 220 is a function of the OS 211 and is an interface for each of the apps 210 to access the libraries 230 provided by the OS 201. The API 220 includes an app management API 221, an event management API 222, a timer API 223, etc.

The app management API 221 executes a starting process, an ending process, and a switching process for each of the apps 210 that is displayed on the LCD. The event management API 222 is a feature of the embodiment and corrects the polling intervals of the apps 210 based on an event list 202, in which events to be executed at the current time or thereafter are registered, and information concerning the electrical power of the mobile terminal apparatus 100. An example of the contents of the event list 202 will be described with reference to FIGS. 4A and 4B.

For example, the event management API 222 corrects intervals such as the re-reading interval designated in an HTML, etc. on the webpage in the browser app 211; the mail query interval to the POP server of the e-mail app 214; etc. The event management API 222 acquires the event list 202 and the information concerning the electrical power from the libraries 230. The timer API 223 supplies information concerning the time point when the timer API 223 is invoked by the apps 210, the event management API 222, etc.

The libraries 230 are a function of the OS 201 and indicate a group of services that are available for the apps 210. The libraries 230 include a timing control library 231, an electrical power control library 232, and a Java (registered trademark) virtual machine (VM) 233.

The timing control library 231 has a function of acquiring in response a request from the timer API 223, time information that is, for example, the current time. The electrical power control library 232 acquires electrical power information in response to a request from the event management API 222. If an object among the execution objects of the apps 210 is not described in a machine language of the mobile terminal apparatus 100 (a negative code) and is described using an intermediate code of Java, the Java VM 233 is a library that enables the execution of the object by the mobile terminal apparatus 100. If all the apps among the apps 210 are described using a negative code, the Java VM 233 may be omitted.

The kernel 240 is software that is the core of the OS 201 and includes a device control unit 241, a process control unit 242, etc. The device control unit 241 has a function of controlling devices 203 connected to the mobile terminal apparatus 100. The devices 203 are, for example, an LCD connected to the LCD I/F 103, cameras connected to the front and the rear camera I/Fs 105 and 107, and an antenna connected to the wireless I/F 108 and to the Wi-Fi I/F 110. The devices 203 further include storage media, etc., such as the flash memory, etc. connected to the USB I/F 109.

For example, the device control unit 241 accesses the LCD I/F 103 and thereby, controls the LCD. The process control unit 242 has a function of controlling the processes executed by the mobile terminal apparatus 100. For example, the process control unit 242 assigns the processes executed by the apps 210 to the CPU 101, based on the priority levels, time sharing, etc.

FIG. 3 is an explanatory diagram of a case where the apps 210 are caused to run at polling intervals corrected by the event management API 222, and depicts the apps 210 and the API 220 extracted from FIG. 2.

The processes of the news app 213 and the e-mail app 214 are switched by the process control unit 242. When the new app 213 and the e-mail app 214 notify the event management API 222 of an execution request for an event, the event management API 222 corrects the polling interval that is to elapse until the next event. The time information is provided by the timer API 223 and after the corrected polling interval elapses, the event management API 222 notifies the apps 210 that issued the execution request that the scheduled starting time of the event has arrived, and the apps 210 that issued the execution request sources execute the event.

Figure 4A:
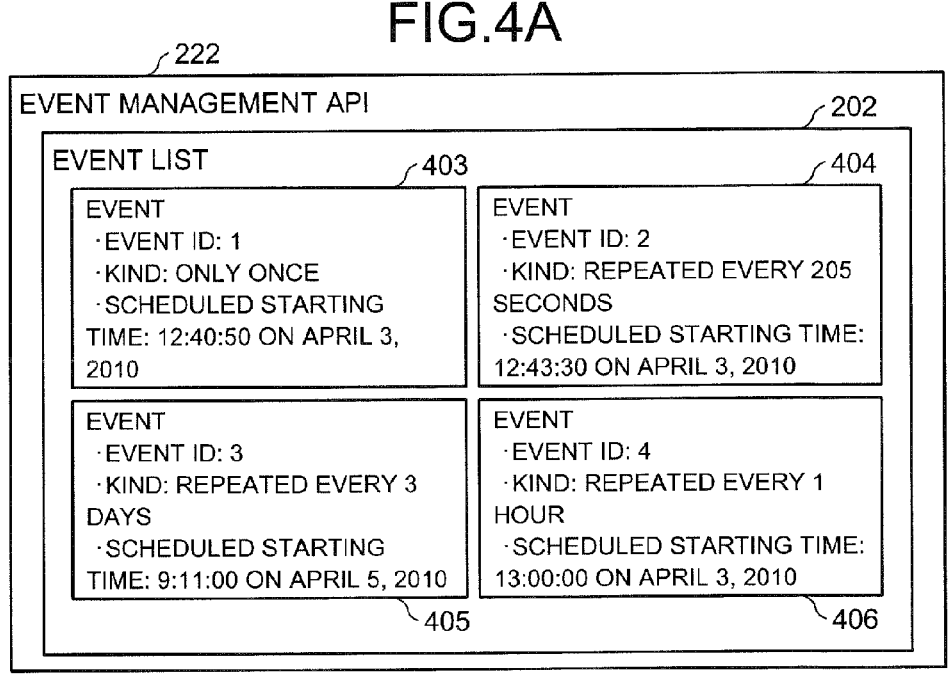
FIGS. 4A and 4B are explanatory diagrams of an example of the processing contents of the event management API 222 and an app management API 221.
Figure 4B:
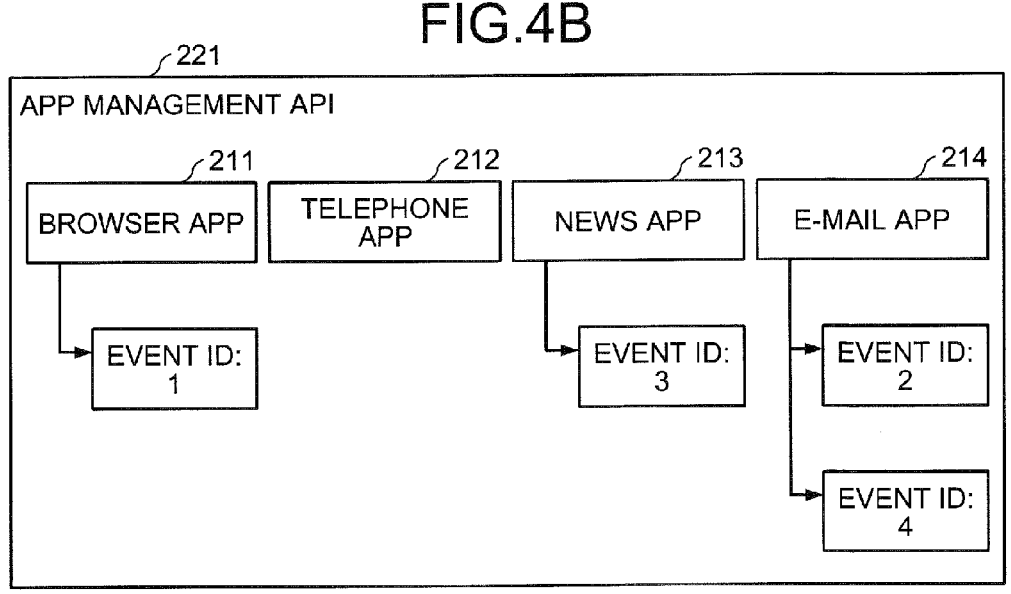

FIGS. 4A and 4B are explanatory diagrams of an example of the processing contents of the event management API 222 and the app management API 221. The event management API 222 manages the event list 202; and the app management API 221 retains information that indicates the relations between the events and the apps 210. FIG. 4A depicts the retention state of the event list 202 by the event management API 222 at the current time of 12:40:40 on Apr. 3, 2010. FIG. 4B depicts the relation between the event and the apps 210 by the app management API 221.

In FIG. 4A, the event list 202 is managed by the event management API 222 and is a list of events that occur triggered by the time designated by one of the apps 210. The types of events include two types including events that occur only once and events that recur regularly. In FIG. 4A, events 403 to 406 are registered in the event list 202.

For each event in the event list 202, the event list 202 has three fields, respectively for the event ID, the type of the event, and the scheduled starting time of the event. The event ID field stores an ID that is correlated with one of the apps 210. The event type field stores information that enables the determination of whether the event occurs only once or recurs regularly; and when the event to be executed is a regularly recurring event, further stores time information indicating at what intervals the event is to be executed. The scheduled starting time field stores the time at which the event is to be executed next.

In FIG. 4B, the app management API 221 stores pointers of the apps 210. Each of the pointers is correlated with an event ID that is registered in the event list 202. For example, the browser app 211 is correlated with an event ID "1". The telephone app 212 is correlated with no event. The news app 213 is correlated with an event ID "3". The e-mail app 214 is correlated with event IDs "2" and "4".

As depicted in FIGS. 4A and 4B, for example, the browser app 211 executes at 12:40:50 on Apr. 3, 2010, the event 403 whose event ID is "1". When the event 403 is an event that executes the re-reading of a given webpage, the browser app 211 re-reads the webpage at the scheduled starting time.

Similarly, at 9:11:00 on Apr. 5, 2010, the news app 213 executes an event 405 whose event ID is "3". When the event 405 is an event to acquire news on the Internet posted after the previous acquisition, the news app 213 acquires the news at the designated scheduled starting time. Because the event 405 is a repeatedly recurring event, such an event is added to the event list 202 as a new event that is scheduled to be executed at 9:11:00 on Apr. 8, 2010, which is three days after the event 405 comes to an end.

Similarly, at 12:43:30 on Apr. 3, 2010, the e-mail app 214 executes the event 404 whose event ID is "2" and also at 13:00:00 on Apr. 3, 2010, executes the event 406 whose event ID is "4". In this case, it is assumed that the e-mail app 214 is software supporting multiple accounts. When the events 404 and 406 are events to execute a check on newly arriving e-mail in a corresponding e-mail account, the e-mail app 214 executes the check on newly arriving e-mail at the designated scheduled starting time. In this manner, one app may invoke plural events. The plural events may each have the same processing content or differing processing content.

The events 404 and 406 are both repeatedly recurring events and therefore, a new event is registered into the event list 202 after the event comes to an end. For example, after the event 404 comes to an end, a new event is registered into the event list 202. The new event is scheduled to be executed at 12:46:55 on Apr. 3, 2010, which is 205 seconds after the starting time of the event 404. After the event 406 comes to an end, a new event is registered into the event list 202. The new event is scheduled to be executed at 14:00:00 on Apr. 3, 2010, which is one hour after the starting time of the event 406.

Figure 5:
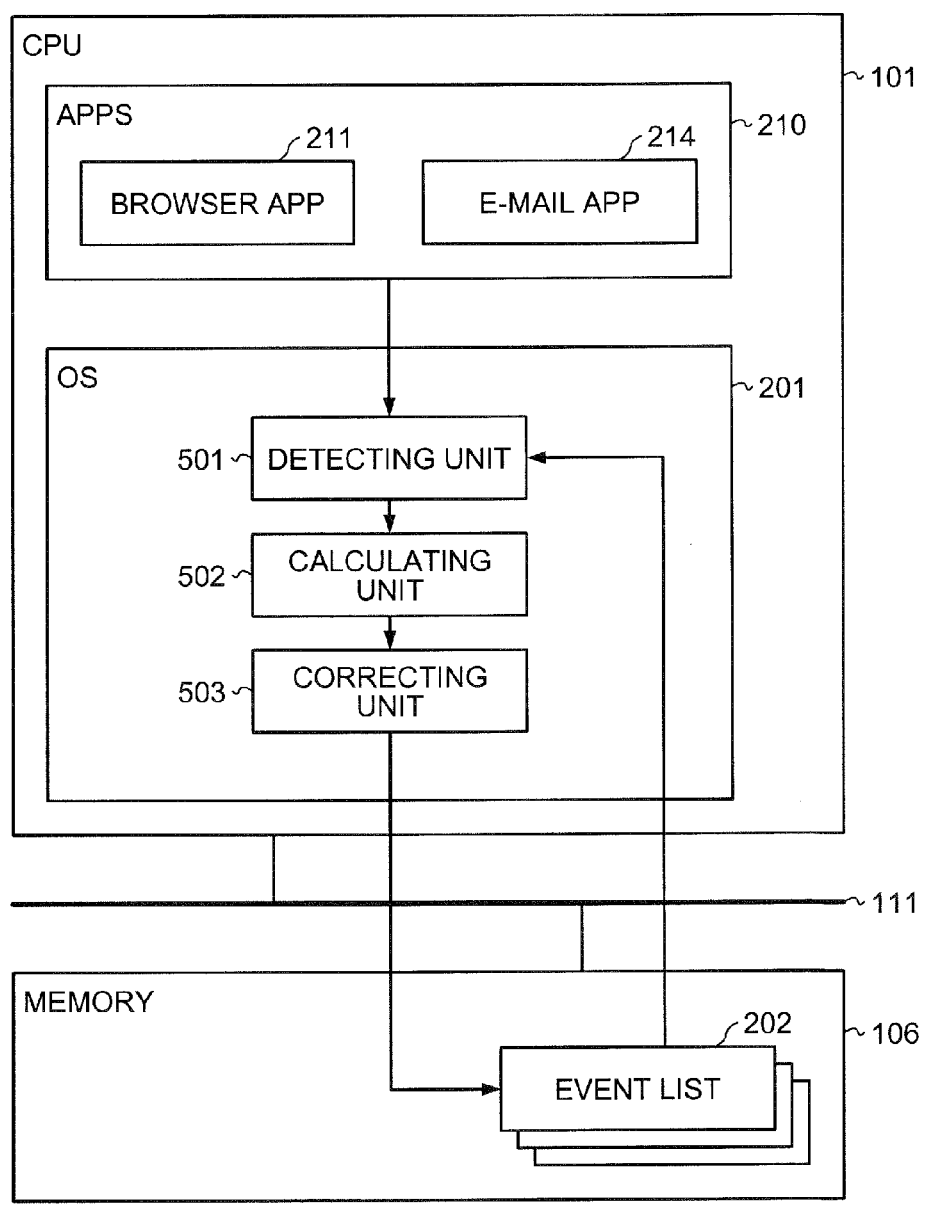
FIG. 5 is a block diagram of functions of the mobile terminal apparatus 100.

FIG. 5 is a block diagram of functions of the mobile terminal apparatus 100. The mobile terminal apparatus 100 includes a detecting unit 501, a calculating unit 502, and a correcting unit 503. The functions from the detecting unit 501 to the correcting unit 503 forming a control unit are implemented by executing on the CPU 101, programs stored in a storage device. The storage device is, for example, the memory 106, a storing medium that is connected to the USB I/F 109, etc.

The detecting unit 501 has a function of detecting the scheduled starting times of two events that are executed at the current time or thereafter. For example, a case is assumed where the current time is 12:41:00 on Apr. 3, 2010 and the event 403 has been executed and deleted from the event list 202. In this case, the detecting unit 501 detects the scheduled starting times of an event to be executed at the current time or thereafter and that is invoked by the browser app 211 and the event 404 that is registered in the event list 202. The detecting unit 501 may detect the scheduled starting times of two events from among the events registered in the event list 202.

When two preceding events that have been executed and have processing contents that are same as the processing contents of the two events for which detection is performed and, as a result, the processing time periods of the two preceding events do not overlap with each other, the detecting unit 501 may detect the scheduled starting times of the two events to be executed at the current time or thereafter. For example, it is assumed that the event invoked by the browser app 211 is an event to be repeatedly executed, and a case is further assumed where there is no overlap of the processing time periods a preceding event that has been executed and has processing content that is same as that of the event invoked by the browser app 211 and of a preceding event executed 205 seconds before the execution of the event 404. In this case, the detecting unit 501 detects the scheduled starting times of the event invoked by the browser app 211 and the event 404. A state in which processing time periods overlap each other indicates a state in which the two events are both currently executed at one point in time.

As a result of the correcting unit 503 correcting the scheduled starting times of the two preceding events, if the processing time periods of the two preceding events do not overlap each other, the detecting unit 501 may detect the scheduled starting times of the two events to be executed at the current time or thereafter. As a result of the correction executed by the correcting unit 503, the processing time periods may not overlap each other due to restriction information of the event to be corrected. In this case, the detecting unit 501 detects the scheduled starting times of the event invoked by the browser app 211 and the event 404. The description of the restriction information and of a specific example thereof will be made in the description of the correcting unit 503.

The detecting unit 501 may detect, as the two events, an event that temporally is to be executed next and another event other than the event that temporally is to be executed next, among the group of events to be executed at the current time or thereafter. For example, when the current time is 12:40:50 on Apr. 3, 2010, the detecting unit 501 may detect the event 404 as the event that temporally is to be executed next, and an event invoked by the browser app 211 as the other event. Further, the detecting unit 501 may detect the event 405 or 406 as the other event. Detected data is stored to the storage area such as a register or a cache memory of the CPU 101, or the memory 106.

The calculating unit 502 has a function of calculating the difference of the scheduled starting times of the two events when the detecting unit 501 detects the scheduled starting times of the two events. For example, the calculating unit 502 calculates the difference of the respective scheduled starting times of the event invoked by the browser app 211 and of the event 404. Assuming that the scheduled starting time of the event invoked by the browser app 211 is 12:44:00 on Apr. 3, 2010, the calculating unit 502 calculates as the difference (12:43:30 on Apr. 3, 2010)−(12:44:00 on Apr. 3, 2010)=−30 [s]. The value of the calculated difference is stored to a storage area such as the register or the cache memory of the CPU 101, or the memory 106.

The correcting unit 503 has a function of correcting the scheduled starting time of at least any one of the two events, based on the difference calculated by the calculating unit 502 and such that the interval between the scheduled starting times of the two events becomes shorter. The correcting unit 503 corrects the scheduled starting time of the event to be corrected to the extent that a restriction indicated in the restriction information of the event to be corrected is observed.

The restriction information is a value based on the specification, etc. of any one of the apps 210 that executes the event to be corrected. For example, as a specification of the polling interval of the browser app 211, a minimal value of the re-reading interval may be set for a given webpage to prevent an increase in the load on the server due to a shortening of the polling interval. The maximal number of accesses enabled in one hour may be set for the given webpage as another specification.

When restriction information is present, the correcting unit 503 corrects the scheduled starting time of the event to be corrected to the extent that a restriction indicated in the restriction information is observed. For example, when the calculated difference is −30 [s], the correcting unit 503 adds (−30 [s]) to the scheduled starting time of the event that is invoked by the browser app 211 and is the event to be corrected, whereby the scheduled starting time thereof becomes 12:43:30 on Apr. 3, 2010. In this case, the scheduled starting time of the event invoked by the browser app 211 and that of the event 404 are same. Thereby, the execution time period of the device 203 can be consolidated and power consumption can be reduced.

When the scheduled starting time of the event to be corrected is the time 12:43:30 on the Apr. 3, 2010 and a restriction indicated in the restriction information cannot be observed, the correcting unit 503 corrects the scheduled starting time of the event to an extent that the restriction indicated in the restriction information is observed. For example, if the restriction information indicates that the event to be corrected can be executed only at 12:43:40 on Apr. 3, 2010 or thereafter, the correcting unit 503 corrects the scheduled starting time of the event to the time that is 23:43:40 on Apr. 3, 2010. A detailed example of correction will be described later with reference to FIG. 6.

The correcting unit 503 may determine one of the two events detected after the other by the detecting unit 501 as the event to be corrected and may correct the scheduled starting time of the event. For example, when the event invoked by the browser app 211 and the event 404 are detected by the detecting unit 501, the correcting unit 503 determines the event that is invoked by the browser app 211 and that is detected after the event 404, as the event to be corrected.

The correcting unit 503 may correct the scheduled starting time of the event to be corrected based on the power consumption of either of the two events, or may correct the scheduled starting time of the event to be corrected based on the amount of the remaining electrical power of the mobile terminal apparatus 100. The power consumption of an event may be the power consumption of the event to be corrected or may be the power consumption of the event not to be corrected. The correcting unit 503 corrects the polling time based on the calculated difference, the power consumption, the amount of the remaining electrical power, etc. such that the restriction information is easily observed. The app may determine whether the corrected polling time observes the restriction information.

Figure 6:
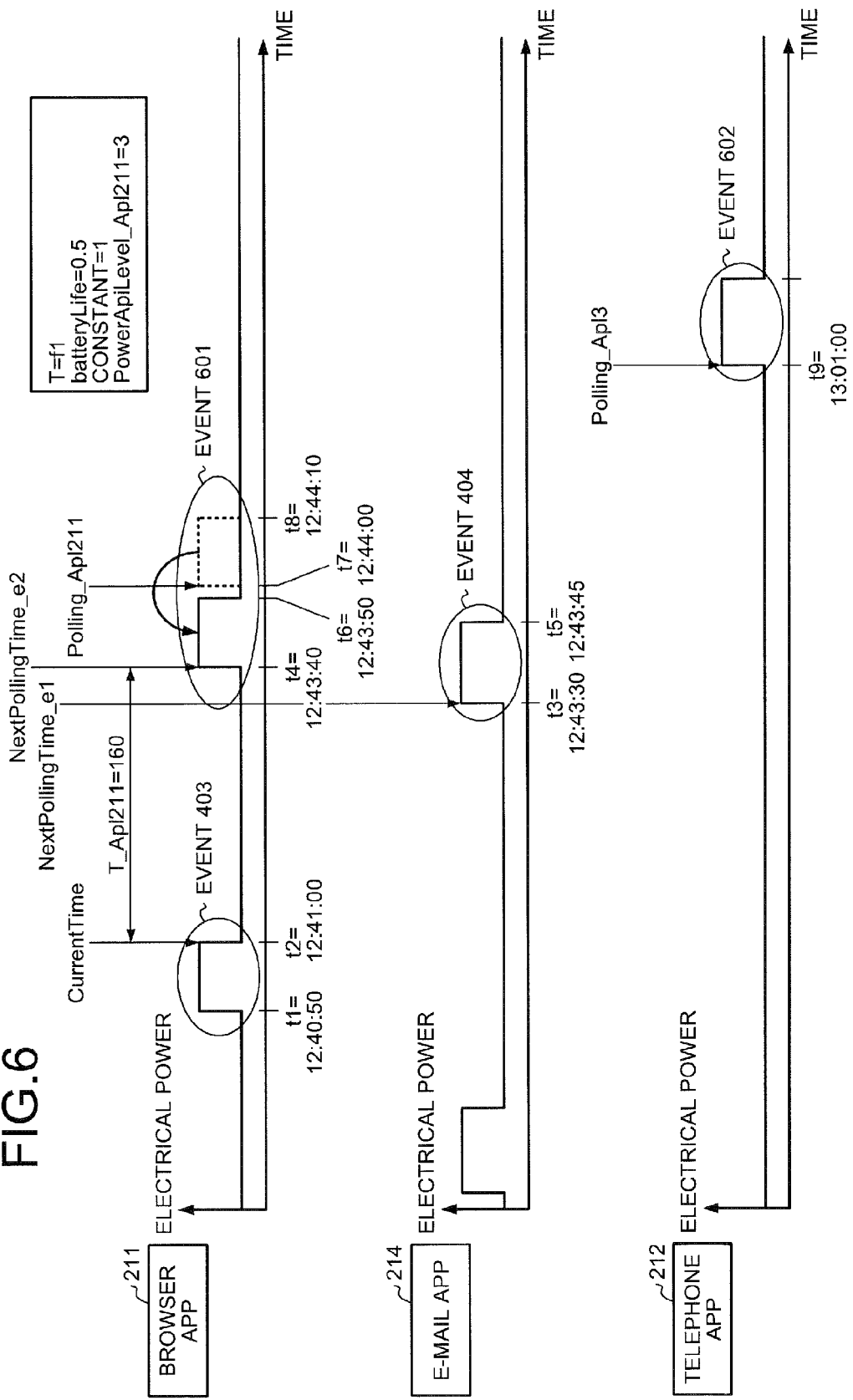
FIG. 6 is an explanatory diagram of an example of the correction of a polling interval.

FIG. 6 is an explanatory diagram of an example of the correction of the polling interval. In the mobile terminal apparatus 100, the app 210 does not independently set the polling interval of the event; and the OS 201 corrects the polling interval to the optimal polling interval based on the value provided from the app 210. Further, the app 210 may correct the scheduled starting time of the event based on the calculated polling interval. Before describing an example of the correction of the polling interval with reference to FIG. 6, an example of a calculation equation for the correction will be described. The event management API 222 corrects the polling interval according to Eq. (1) below.

$$\text{NextPollingTime}\_eN = \text{CurrentTime} + T\_Apl1 \quad (1)$$

Where, with respect to an app 1 included among the apps 210, "NextPollingTime_eN" represents the scheduled starting time obtained by the correction is executed for the event to be corrected; "_eN" indicates that the event is the N-th event to be executed among the events in the event list 202; "N" is a natural number; "CurrentTime" represents the current time; and "T_Apl1" represents the calculated polling interval obtained by the correction. The event management API 222 calculates the polling interval T_Apl1 obtained by the correction using a function f1 below.

$$T\_Apl1 = f1(PowerApiLevel\_Apl1, Polling\_Apl1)f1$$
$$(PowerApiLevel\_Apl1, Polling\_Apl1) = (Polling\_Apl1 - CurrentTime) + (NextPollingTime\_e1 - Polling\_Apl1)*constant/(PowerApiLevel\_Apl1*BatteryLife)$$

Where, "Polling_Apl1" represents the respective scheduled starting times that are of the event and used before the correction and of the app 1; and "_Apl1" indicates that the symbol therewith concerns the app 1. "Polling_Apl1" can be calculated by adding to the current time, the polling interval that is determined by the app 1 from the specification thereof, etc.

"NextPollingTime_e1" represents the scheduled starting time of the event that temporally is to be executed next among the events in the event list 202. In the description below with reference to FIG. 6, an app that executes the event that temporally is to be executed next, will be referred to as "app 2". As described, the function f1 is used to calculate the polling interval that is the numerator portion of the second term of the function f1 and that is to be obtained by the correction based on the difference between the scheduled starting time of the event used before the correction of the app 1 and the scheduled starting time of the event that temporally is to be executed next.

"PowerApiLevel_Apl1" represents an index of the power consumption of the app 1. An "index of the power consumption" indicates the amount of power consumed, where an index of "1" indicates maximal power consumption and as the value of the index increases, the indicated power consumption becomes lower. For example, "PowerApiLevel" can be calculated using Eq. (2) below.

$$PowerApiLevel = (\text{the power consumption necessary when the load on the CPU 101 is 100\%/the power consumption of the app}) \quad (2)$$

By applying Eq. (2), for example, when the power consumption is 3 [mW] of the CPU 101 having a load of 100%, for an app consuming 3 [mW], the index of the power consumption is the index=(3/3)=1. For an app consuming 1 [mW], the index of the power consumption is the index=(3/1)=3.

The event management API 222 may execute the correction based on threshold values as the restriction information such as an upper limit value and a lower limit value to impose restrictions on the polling interval obtained by correction. For example, it is assumed as the specification of the polling interval of the browser app 211 that a minimal value is set for the re-reading interval of the given webpage. When such a restriction is present, the lower limit value may be set to be the minimal value of the re-reading interval for a given webpage and when the result of the calculation executed using the function f1 is less than the lower limit value, the event management API 222 may set to the lower limit value, the corrected polling interval T to be acquired by correction.

"BatteryLife" represents the remaining amount of the electrical power of the mobile terminal apparatus 100. For example, BatteryLife takes a numerical value from zero to one. When the numerical value is zero, this indicates a completely discharged state meaning that no electrical power remains, and when the numerical value is one, this indicates a fully charged state. The constant takes a numerical value from zero to one, is restriction information for the entire mobile terminal apparatus 100, and is a parameter to expand or shrink the second term of the function f1. When the constant is close to zero, it takes a long time for the processing time periods of the apps 1 and 2 to overlap with each other. However, the mobile terminal apparatus 100 prioritizes maintenance of the polling interval used before the correction and the observation of a restriction of the restriction information. When the constant is close to one, it takes less time for the processing time periods of the apps 1 and 2 to overlap each other and the mobile terminal apparatus 100 prioritizes reduction of the power consumption thereof.

Due to the function f1, taking an average over a long period, the polling intervals are converged to the polling interval determined by the app 1 based on the specification, etc. However, each polling interval approaches the polling of another event immediately close thereto. When only one event is present, the event management API 222 does not execute the function f1 because NextPollingTime_e1 is not present. Therefore, the scheduled starting time of the corresponding event becomes same as Polling_Apl1 and the polling interval becomes equal to the polling interval determined by the app 1 based on the specification, etc.

The event management API 222 may calculate the polling interval T_Apl1 to be acquired by the correction using a function f2 below.

$$T\_Apl1 = f2(PowerApiLevel\_Apl1, Polling\_Apl1) = (Polling\_Apl1 - CurrentTime) + (NextPollingTime\_e1 - Polling\_Apl1)*constant/\exp(PowerApiLevel\_Apl1*BatteryLife)$$

Compared to the function f1, the function f2 can reduce the effects of the power consumption of the hardware and that of the app 1. When the denominator of each of the functions f1 and f2 is less than one, the event management API 222 may perform the calculation by replacing the denominator with one. The reason for this is that, when the denominator is less than one, the result of the function f1 may be a value that is larger than the difference between two events that is NextPollingTime_e1−Polling_Apl1. In a case where the denominator is not replaced with one, for example, when the scheduled starting time of the event to be corrected is same as or after the scheduled starting time of the other event, the scheduled starting time of the event to be corrected may be corrected to the time same as or before the scheduled starting time of the other event.

Figure 7:
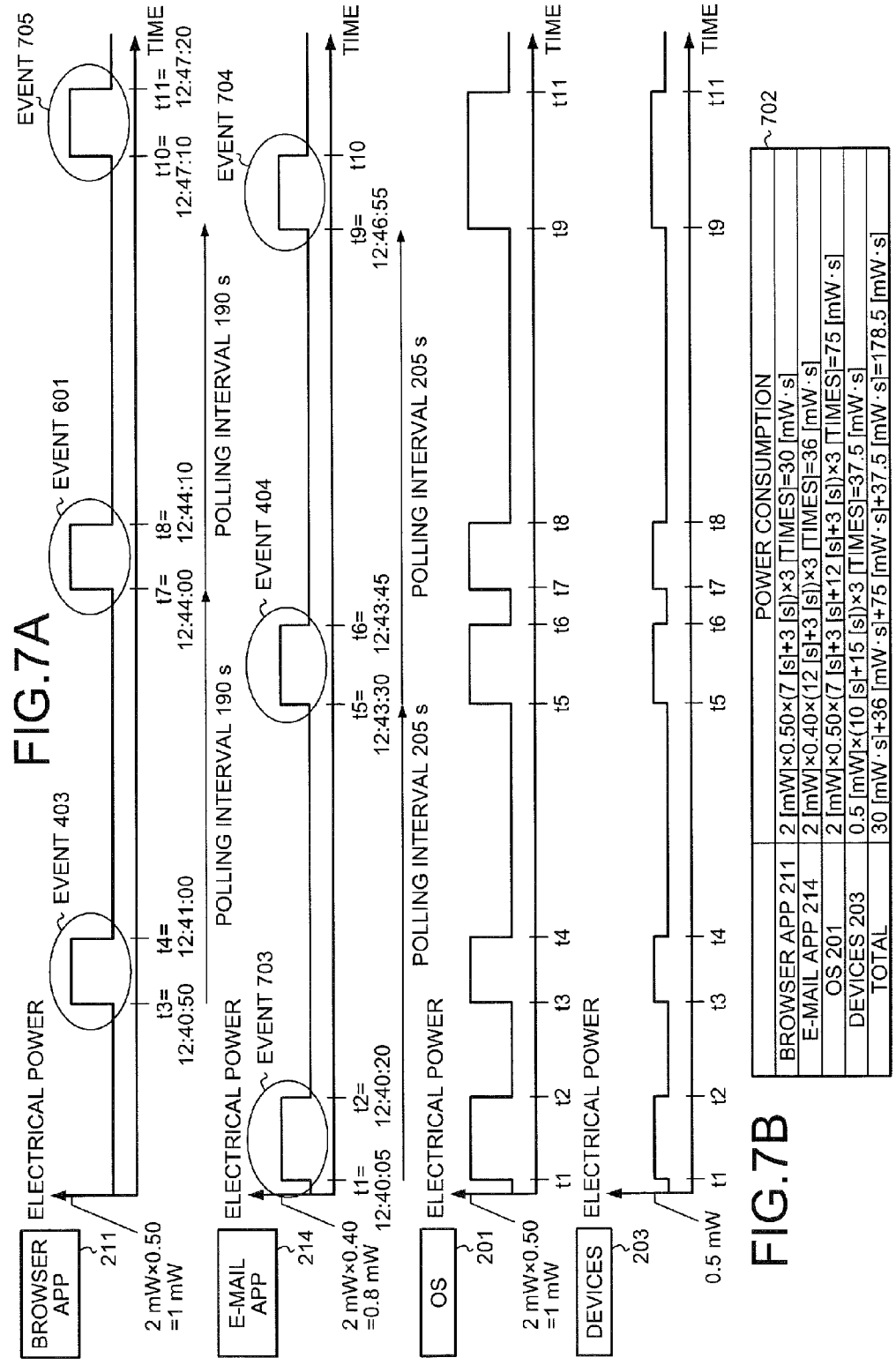
FIGS. 7A and 7B are explanatory diagrams of the power consumption of the mobile terminal apparatus 100 when a polling interval T is not corrected.
Figure 8:
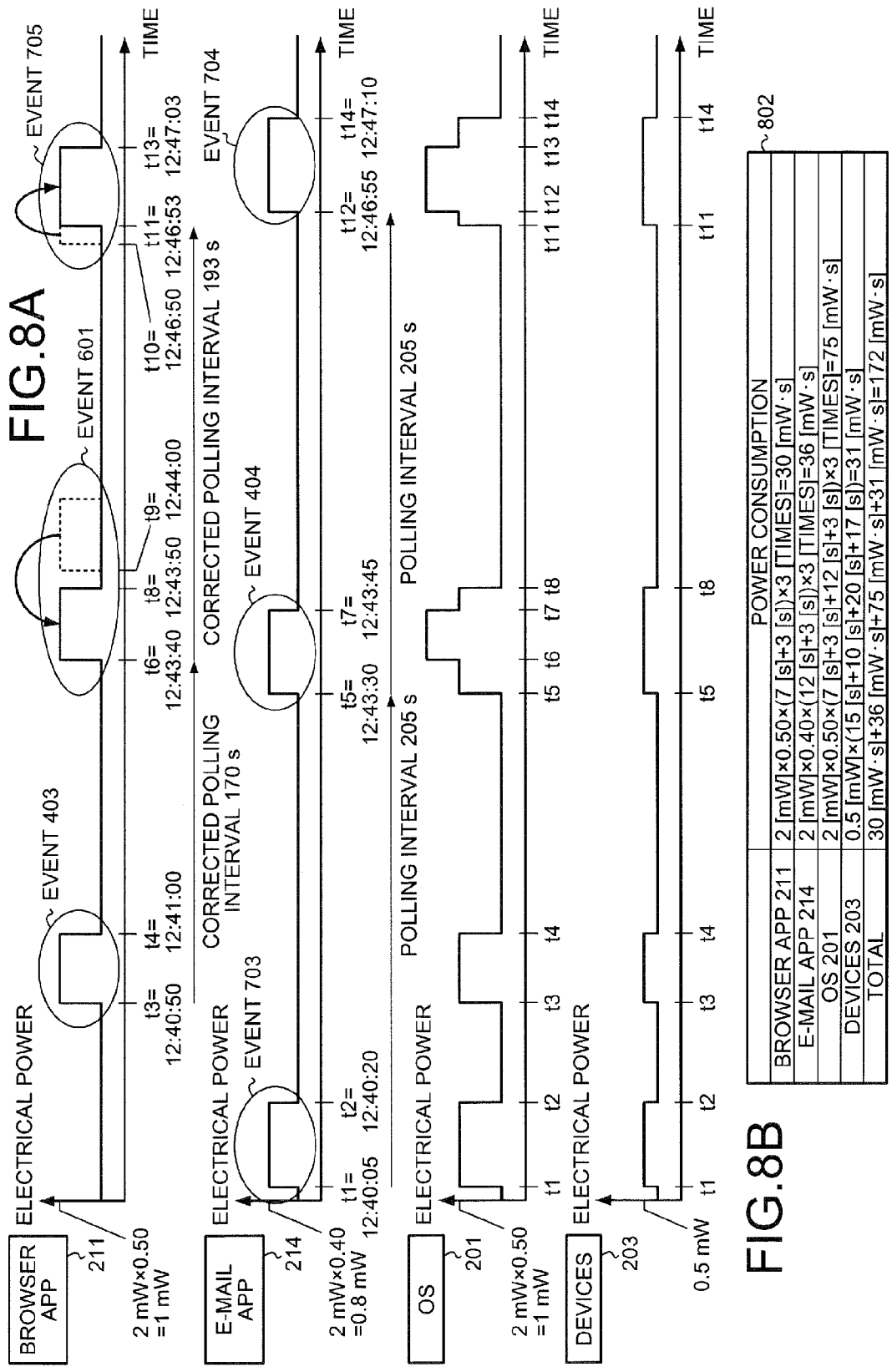
FIGS. 8A and 8B are explanatory diagrams of the power consumption of the mobile terminal apparatus 100 when the polling terminal T is corrected.

An example of the correction of the polling interval will be described taking the example depicted in FIG. 6 using the function f1. The description will be made with reference to FIG. 6 taking an example of a case where a new event is invoked by the browser app 211 after the execution of the event 403 comes to an end. For simplification of the description, a time on Apr. 3, 2010 is used when the date and the time are not designated in the description of the time made with reference to FIGS. 6 to 8.

The browser app 211 starts execution of the event 403 at a time t1 that is t1=12:40:50 and causes the execution to come to an end at a time t2 that is t2=12:41:00. The timing control library 231 starts at the time t2, processing for the event 601 as the event whose polling interval is to be corrected when the event 601, whose execution is to be started at a time t7 that is t7=12:44:00, is invoked by the browser app 211. It is assumed that, at the time t2, the event list 202 includes the events 404 to 406. Therefore, the event that temporally is to be executed next is the event 404 whose execution is to be started at a time t3 that is t3=12:43:30.

"_Apl1" representing the app 1 in the function f1 is replaced with "_Apl211" representing the browser app 211 and "_e1" representing the event that temporally is to be executed next is replaced with "_E404" representing the event 404 and the function f1 is expressed. This provides Eq. (3) below.

$$f1(\text{Power}ApiLevel\_Apl211, \text{Polling}\_Apl211) = (\text{Polling}\_Apl211 - \text{CurrentTime}) + (\text{NextPollingTime}\_E404 - \text{Polling}\_Apl211)*\text{constant}/(\text{PowerApiLevel}\_Apl211*\text{BatteryLife}) \quad (3)$$

The event management API 222 substitutes PowerApiLevel_Apl211=3, Pollin_Apl211=the time t7, and the constant=1 in Eq. (3), as the information concerning the browser app 211, and further substitutes other variables that include CurrentTime=the time t2, NextPollingTime_E404=the time t3, and BatteryLife=0.5. As a result, the event management API 222 calculates the polling interval T_Apl211 to be used after the correction and acquires Eq. (4) below.

$$\begin{aligned} T\_Apl211 &= (\text{time } t7 - \text{time } t2) + (\text{time } t3 - \text{time } t7) * 1/(3*0.5) \quad (4)\\ &= 180 + (-30)/1.5 \\ &= 160 \text{ [s]} \end{aligned}$$

The event management API 222 substitutes Eq. (4) into Eq. (1), acquires Eq. (5) below, and thereby, calculates the scheduled starting time NextPollingTime_e2 to be used after the correction of the event 601.

$$\text{NextPollingTime}\_e2 = \text{time } t2 + 160 = 12:43:40 \text{(time } t4) \quad (5)$$

As the result of the calculation, the processing time period of the event 601 is corrected from that spanning from the time t7 to a time t8=12:44:10, to that spanning from the time t4 to a time t6=12:43:50. Based on the correction and from the processing time period of the event 601 and the processing time period of the event 404 spanning from the time t3 to the time t5=12:43:45, the mobile terminal apparatus 100 can consolidate the execution time periods of the devices 203 for the time period spanning from the time t4 to the time t5 during which the processing time periods overlap with each other. Thereby, the mobile terminal apparatus 100 can reduce the execution time period of the devices 203 and can reduce power consumption.

The calculation is executed according to the functions f1 and f2 and using the scheduled starting time of the event that temporally is executed next. However, the calculation may be executed using the scheduled starting time of the event whose scheduled starting time is the closest to the scheduled starting time of the event used before the correction. For example, a case is assumed where, at the current time that is the time t2, the telephone app 212 invokes the event 602 whose scheduled starting time is a time t9 that is t9=13:01:00.

In this case, the event management API 222 may perform the calculation using the scheduled starting time of the event 406 that is the closest event whose scheduled starting time is the closest to the scheduled starting time of the event 602 that is used before the correction, among the events registered in the event list 202. When the mobile terminal apparatus 100 selects the event whose scheduled starting time is the closest, the mobile terminal apparatus 100 calculates the difference between the scheduled starting time of the invoked event and the scheduled starting time of each of the events already registered in the event list 202, and selects as the closest event, the event yielding the smallest difference. The selection of the closest event causes the difference between the scheduled starting time of the event used before the correction and that of the unexecuted event to be small and therefore, the processing time periods of the two events tend to overlap with each other even when a restriction indicated in the restriction information is observed. Consequently, power consumption can be reduced.

Although the newly detected event 601 is determined as the event to be corrected in the example of FIG. 6, the mobile terminal apparatus 100 may determine the event 404 that is detected earlier than the event 601 as the event to be corrected and may correct the scheduled starting time. The mobile terminal apparatus 100 may determine each of the events 601 and 404 as the event to be corrected.

In this case, for example, the mobile terminal apparatus 100 may set the average value of the scheduled starting times of the events 601 and 404=(the time t3+the time t7)/2=12:43:45 to be the scheduled starting time of a virtual event; and may correct the scheduled starting times of the events based on the scheduled starting time of the virtual event. Thereby, the interval between the scheduled starting times of the event 601 and the virtual event, and the interval between the scheduled starting times of the event 404 and the virtual event both become shorter than those in a case where any one of the events is the event to be corrected. Therefore, the mobile terminal apparatus 100 can easily observe the restriction indicated in the restriction information and, when the processing time periods of the two events overlap each other, the power consumption of the mobile terminal apparatus 100 can be reduced.

In the functions f1 and f2, PowerApiLevel is substituted with the index PowerApiLevel_Apl1 of the power consumption of the app 1 that executes the event to be corrected. For "PowerApiLevel", the index of the power consumption of the app 2 may be used.

Among the indices of the power consumption of the apps 1 and 2, the larger index may be selected and used. The reason the index of power consumption whose value is larger, that is, the power consumption that is lower, is selected is as follows. When the power consumption of the app is lower, the power consumption of the device 203 that executes the app is also lower associated with the app. When an execution time period of high power consumption and an execution time period of low power consumption overlap with each other, the largest reduction in power consumption is equivalent to the low power consumption. In this manner, the largest amount of reduced power consumption depends on the power consumption that is lower and therefore, the mobile terminal apparatus 100 can correct the polling interval based on the largest amount of reduced power consumption by selecting the index of the power consumption whose value is larger.

With reference to FIGS. 7A, 7B, 8A, and 8B, the difference in the power consumption will be described between cases where the polling interval T is not corrected by the event management API 222 and where the polling interval T is corrected. FIGS. 7A, 7B, 8A, and 8B depict an example of the calculation of the respective power consumptions of the browser app 211, the e-mail app 214, the OS 201, and the devices 203, as the details of the power consumption of the mobile terminal apparatus 100; and an example of calculation of the power consumption of the mobile terminal apparatus 100 by totaling the calculated power consumption.

In FIGS. 7A, 7B, 8A, and 8B, the following preconditions are assumed. It is first assumed that in the calculation of the power consumption, the power consumption of each of the CPU 101 and the devices 203 in a low electrical power mode is zero [mW]. The devices 203 depicted in FIGS. 7A, 7B, 8A, and 8B are devices accessed by both of the browser app 211 and the e-mail app 214. For example, the devices 203 include the antenna connected to the Wi-Fi I/F 110. It is further assumed that the polling interval of the browser app 211 used before the correction is 190 [s] and the polling interval of the e-mail app 214 used before the correction is 205 [s].

FIGS. 7A and 7B are explanatory diagrams of the power consumption of the mobile terminal apparatus 100 when the polling interval T is not corrected. FIG. 7A depicts the power consumption varying over time, for the browser app 211, the e-mail app 214, the OS 201, and the devices of 203. FIG. 7B depicts power consumption.

It is assumed in FIGS. 7A, 7B, 8A, and 8B that the events 403 and 601, and the event 705 whose scheduled starting time is a time t10=12:47:10 are executed as the events of the browser app 211. Similarly, an event 703 whose scheduled starting time is the time t1=12:40:05, the event 404, and an event 704 whose scheduled starting time is a time t9=12:46:55 are executed as the events of the e-mail app 214.

The power consumption of the app 210 is "the power consumption of the CPU 101 by the app 210×the average utilization rate of the CPU 101 by the app 210×(the active time period of the CPU 101+a constant time period)". The "active time period of the CPU 101+the constant time period" is set to be the processing time period of the app 210. In addition to the power consumption of the CPU 101, the power consumption of the memory 106 and the bus 111 are present. However, in the calculation depicted in FIGS. 7A, 7B, 8A, and 8B, the calculation is executed such that the power consumption of the memory 106 and the bus 111 is included in the power consumption of the CPU 101.

For example, in the example of FIGS. 7A and 7B, the power consumption of the CPU 101 by the browser app 211 is set to be 2 [mW]; the average utilization rate of the CPU 101 by the browser app 211 is set to be 0.50; the processing time period of the browser app 211 is set to be the active time period of the CPU 101 that is 7 [s]+the constant time period that is 3 [s]=10 [s]. When the CPU 101 causes the active time period thereof to come to an end, the CPU 101 transitions to the low electrical power mode after a constant time period elapses.

In the example of FIGS. 7A and 7B, processing intervals of the browser app 211 are from the time t3=12:40:50 to the time t4=12:41:00, from the time t7=12:44:00 to the time t8=12:44:10, and from the time t10 to the time t11=12:47:20. Using the values above, the electrical power consumption of the browser app 211 is 2 [mW]×0.50×(7 [s]+3 [s])×3 [times]=30 [mW·s].

Similarly, consequent to the e-mail app 214, the electrical power consumption of the CPU 101 is assumed to be 2 [mW] and the average utilization rate of the CPU 101 is assumed to be 0.40. Further, the processing time period of the e-mail app 214 is assumed to be the active time period 12 [s] of the CPU 101+a constant time period 3 [s]=15 [s]. The processing intervals of the e-mail app 214 in the example depicted in FIGS. 7A and 7B are the time t1 to the time t2=12:40:20, the time t5=12:43:30 to the time t6=12:43:45, and the time t9=12:46:55 to the time t10. Using the values above, the electrical power consumption of the e-mail app 214 is 2 [mW]×0.40×(12 [s]+3 [s])×3 [times]=36 [mW·s].

The power consumption of the OS 201 is "the power consumption of the CPU 101 by the OS 201×the average utilization rate of the CPU 101 by the OS 201×the active time period of the OS 201". When CPU 101 causes the active time period of the OS 201 to come to an end, the CPU 101 transitions to the low electrical power mode after the constant time period elapses.

The active time period of the OS 201 is the processing time period of the app 210. Consequent to the OS 201, the electrical power consumption of the CPU 101 is assumed to be 2 [mW] and the average utilization rate the CPU 101 is assumed to be 0.5. Further, the active time period of the OS 201 is the overlapping time of the processing time period of the browser app 211 and the processing time period of the e-mail app 214. The time intervals when the OS 201 is active are from the time t1 to the time t2, from the time t3 to the time t4, from the time t5 to the time t6, from the time t7 to the time t8, and from the time t9 to the time t11. Using the values above, the electrical power consumption of the OS 201 is 2 [mW]×0.50×(7 [s]+3 [s]+12 [s]+3 [s])×3 [times]=75[mW·s].

The power consumption of the devices 203 is "the power consumption of the devices 203×the active time period of the devices 203". In addition to the power consumption of the devices 203, the power consumption of the I/Fs connected to the devices 203 is also present. However, in the calculation in FIGS. 7A, 7B, 8A, and 8B, the power consumption of the I/Fs are included in the power consumption of the devices 203, for the calculation. The devices 203 transition to the low power consumption mode when the active time period of the devices 203 comes to an end.

In the example depicted in FIGS. 7A and 7B, the power consumption of the devices 203 is assumed to be 0.5 [mW]. Further, the active time period of the devices 203 is the overlapping time of the processing time period of the browser app 211 and the processing time period of the e-mail app 214, and is equivalent to the active time period of the OS 201. Using the values above, the electrical power consumption of the devices 203 is 0.5 [mW]×(10 [s]+15 [s])×3 [times]=37.5 [mW·s]. Thus, the power consumption of the mobile terminal apparatus 100 is 3 0 [mW·s]+36 [mW·s]+75 [mW·s]+37.5 [mW·s]=178.5 [mW·s].

FIGS. 8A and 8B are explanatory diagrams of the power consumption of the mobile terminal apparatus 100 when the polling terminal T is corrected. FIG. 8A depicts the respective power consumptions of the browser app 211, the e-mail app 214, the OS 201, and the devices 203 over time. FIG. 8B depicts the power consumption. The browser app 211 executes correction of the scheduled starting time of the events 601 and 705. Among the times t1 to t11 used in FIG. 7A and the times t1 to t14 used in FIG. 8A, the times t1 to t5 represent the same times in both diagrams and the times t6 and thereafter represent times that differ between the diagrams.

The calculation contents for the correction of the event 601 is same as that depicted in FIG. 6 and therefore, will not again be described. As a result of the correction, the scheduled starting time of the event 601 is corrected from the time t9 that is t9=12:44:00 to the time t6 that is t6=12:43:40. Details of the calculation for the correction of the event 705 are as follows. The current time at which the correction is executed is the time t8 that is t8=12:43:50 at which the execution of the event 601 comes to an end. The scheduled starting time of the event 705 is the time t10 that is t10=12:46:50, acquired by adding the polling interval=190 [s] to the time t6. The event that temporally is to be executed next is the event 704 and the scheduled starting time thereof is the time t12 that is t12=12:46:55.

The event management API 222 substitutes values into the function f1 and obtains Eq. (6) below. The substituted values are Polling_Apl1=the time t10, CurrentTime=the time t8, NextPollingTime_e1=the time t12, constant=1, PowerApiLevel_Apl1=3, and BatteryLife=0.5.

$$T = (\text{the time } t10 - \text{the time } t8) + (\text{the time } t12 - \text{the time } t10) * 1/(3*0.5) \quad (6)$$

$$= 180 + 5/(1.5)$$

$$\approx 183 \, [s]$$

The event management API 222 acquires Eq. (7) below by substituting Eq. (6) into Eq. (1) and thereby, calculates the scheduled starting time NextPollingTime_e2 to be obtained by the correction of the event 705.

NextPollingTime_e2=the time *t*8+183=12:46:53(the time *t*11)             (7)

As a result of the calculation, the processing time period of the event 705 is corrected to be the time t11 to the time t13=12:47:03. The power consumption for the processing by the browser app 211 does not vary as that in FIGS. 7A and 7B and is 30 [mW·s]. For the power consumption of the e-mail app 214 obtained by the correction of the polling interval, the processing intervals of the e-mail app 214 are the time t1 to the time t2, the time t5 to the time t7=12:43:45, and the time t12 to the time t14=12:47:10 from FIGS. 8A and 8B. As described, the processing time period of the e-mail app 214 in FIGS. 7A and 7B and that in FIGS. 8A and 8B are the same and therefore, the power consumption thereof in FIGS. 7A and 7B and that in FIGS. 8A and 8B are also equal, i.e., are respectively 36 [mW·s].

The power consumption of the OS 201 obtained by the correction of the polling interval is calculated. The time intervals for the OS 201 to be active are the time t1 to the time t2, the time t3 to the time t4, the time t5 to the time t8, and the time t11 to the time t14. The total of the active time periods is 15 [s]+10 [s]+20 [s]+17 [s]=62 [s]. This value is shorter than the execution time period of the OS 201 depicted in FIGS. 7A and 7B=(7 [s]+3 [s]+12 [s]+3 [s])×3 [times]=75 [s]. However, in the time periods that are the time t6 to the time 7 and the time t12 to the time t13, the two executing apps are present and, the amount of work of the OS 201 is increased by an amount corresponding to the work of the two apps. Therefore, the total amount of work does not vary and the power consumption of the OS 201 is same as that in FIGS. 7A and 7B and is 75 [mW·s].

The power consumption of the devices 203 obtained by the correction of the polling interval is calculated. The active time period of the devices 203 is equal to that of the OS 201. The power consumption of the devices 203 is 0.5 [mW]×(15 [s]+10 [s]+20 [s]+17 [s])=31 [mW·s]. From the above, the power consumption of the mobile terminal apparatus 100 is 30 [mW·s]+36 [mW·s]+75 [mW·s]+31 [mW·s]=172 [mW·s]. The mobile terminal apparatus 100 can reduce power consumption by consolidating the execution time periods of the devices 203 into one execution time period.

The polling interval of the browser app 211 consequently is reduced from the polling interval=190 [s] that is the polling interval used before the correction to 170 [s], based on the correction for the event 601 that is a first correction. Consequent to the first correction, the scheduled starting time of the event 705, which is the next event of the same process, becomes a time that is before the event 704, which was to be executed next. Thus, consequent to the correction for the event 705 that is a second correction, the polling interval is increased from 190 [s] to 193 [s]. The average of the polling intervals acquired by the first and the second correction is (170+193)/2=181.5 [s] and consequently approaches to the polling interval used before the correction=190 [s].

As described, the mobile terminal apparatus 100 corrects the scheduled starting time of the event that temporally is to be executed next and thereby, the long-term average of the polling intervals of the event to be corrected can be converged to the polling interval used before the correction. The convergence of the average to the polling interval used before the correction enables the mobile terminal apparatus 100 to easily observe the restriction information. Especially, if the restriction information indicates a count per given time period, the mobile terminal apparatus 100 can easily observe the restriction indicated in the restriction information, by the convergence of the long-term average to the polling interval used before the correction.

The execution time period of the devices 203 becomes 20 [s] consequent to the first correction and becomes 17 [s] consequent to the second correction. Therefore, the amount by which the power consumption is reduced is larger based on the second correction than that based on the first correction. As described, the stepwise execution of the correction causes the interval of the scheduled starting times to be shortened and therefore, the amount by which the power consumption is reduced can be increased. Even if the execution time period of the devices 203 cannot be shortened and the power consumption thereof is not reduced by the first correction because a restriction indicated in the restriction information is observed, the difference between the scheduled starting times is smaller due to the first correction than the difference between the scheduled starting times without any correction. Therefore, the mobile terminal apparatus 100 executes the stepwise correction and can finally cause the execution time period of the devices 203 to be shortened and the power consumption thereof to be reduced.

Figure 9:
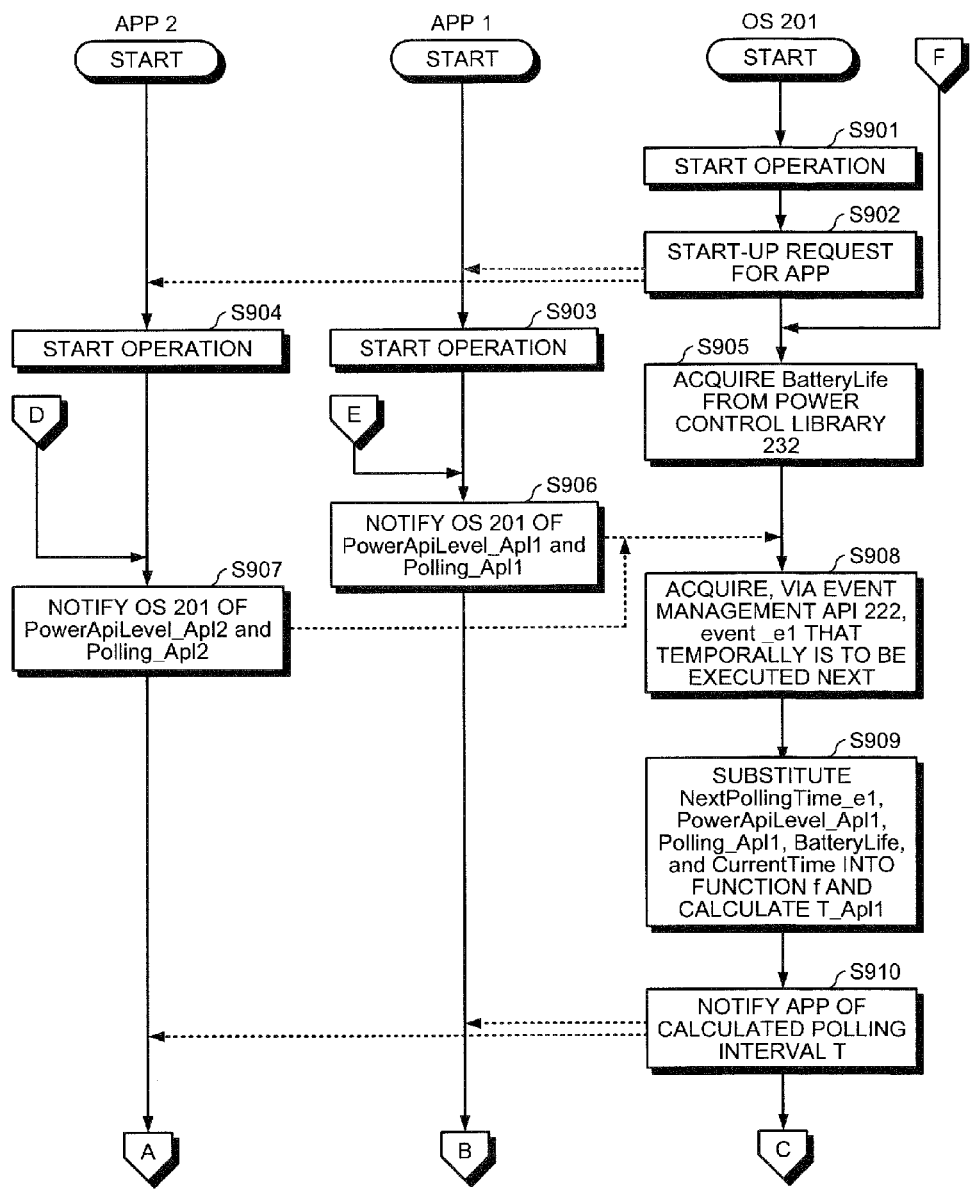
FIG. 9 is a flowchart (Part I) of a polling interval correction process.

FIGS. 9 and 10 depict a polling interval correction process of executing the correction of the polling interval executed by the OS 201. It is assumed that the apps started up in FIGS. 9 and 10 are the apps 1 and 2 included in the apps 210. During the operation of the mobile terminal apparatus 100, one app may be started up or three or more apps may be started up.

FIG. 9 is a flowchart (Part I) of the polling interval correction process. The OS 201 starts operation after the booting of the mobile terminal apparatus 100 comes to an end, etc. (step S901) and, after the start of the operation, executes a start-up request for the apps according to an instruction from the user, etc. (step S902). The app 1 receives the start-up request and starts operation (step S903). The app 2 receives the start-up request and also starts operation (step S904). After the start of the operations, the apps 1 and 2 each start an event invoking process that performs the polling correction.

The OS 201 acquires "BatteryLife" from the power control library 232 (step S905). The app 1 after starting operation notifies the OS 201 of PowerApiLevel_Apl1 and Polling_Apl1 (step S906). Similarly, the app 2 notifies the OS 201 of PowerApiLevel_Apl2 and Polling_Apl2 (step S907). The OS 201 acquires, via the event management API 222, an event e1 that temporally is to be executed next (step S908).

It is assumed thereafter that, among the notifications issued at steps S906 and S907, the OS 201 receives the notification issued at step S906 first. After acquiring the event _e1, the OS 201 substitutes NextPollingTime_e1, PowerApiLevel_Apl1, Polling_Apl1, BatteryLife, and CurrentTime into the function f, and calculates the polling interval T_Apl1 (step S909).

At step S909, if the notification issued at step S907 from the app 2 is received first, the OS 201 substitutes the values of the app 2 and calculates the polling interval T_Apl2. The calculation of the polling interval T_Apl2 of the app 2 related to the notification that is given at step S907 and received after the notification issued in the process at step S906, is executed when the operation at step S909 is again executed. To acquire CurrentTime, the OS 201 invokes the timer API 223 and acquires CurrentTime before executing the operation at step S909.

After the calculation, the OS 201 notifies the app of the calculated polling interval T (step S910). Concerning the app to which notification is given, the OS 201 notifies the app 1 when the polling interval T calculated at step S909 is T_Apl1, and notifies the app 2 when the polling interval T is T_Apl2.

FIG. 10 is a flowchart (Part II) of the polling interval correction process. It is assumed that the OS 201 notifies the app 1 at step S910. The app 1 acquires the polling interval T_Apl1 (step S1001) and by an operation specific to the app 1, generates an execution request for an event _eN (step S1002). The event _eN is registered into the event list 202 by the event management API 222 invoked by the app 1. After the registration, the app 1 stands by until the event _eN is to be executed (step S1003). At step S1003, if an executable process other than the event _eN is present, the app 1 may execute the other process, without standing by, in addition to the execution of the event _eN.

The OS 201 determines whether the event management API 222 has detected registration of a new event _eN (step S1007). If the OS 201 determines that the event management API 222 has detected registration (step S1007: YES), the OS 201 determines the event _eN as the event to be corrected and corrects the scheduled starting time NextPollignTime_eN of the event _eN to CurrentTime+T_Apl1 (step S1008).

The app 1 after acquiring T_Apl1 at step at S1001 may update T_Apl1, based on the restriction information retained by the app 1. For example, it is assumed that, although T_Apl1 is reported to be 160 [s], the restriction information of the app 1 stipulates that the polling interval be within a range of 170 to 190 [s]. In this case, assuming that T_Apl1' is T_Apl1'=170 [s], the app 1 notifies the OS 201 of T_Apl1' at step S1002. At step S1008, the OS 201 corrects the scheduled starting time NextPollingTime_eN of the event _eN to CurrentTime+T_Apl1.

After the process at step S1008 comes to an end or if the OS 201 determines that the event management API 222 has not detected the registration of a new event (step S1007: NO), the OS 201 determines, using the timer API 223, whether the scheduled starting time of an event among the events registered in the event list 202 has arrived (step S1009). If the OS 201 determines that the scheduled starting time of an event has arrived (step S1009: YES), the OS 201 notifies the app corresponding to the event, that the scheduled starting time of the event has arrived (step S1010). After the notification is made to the app or if the OS 201 determines that the scheduled starting time of an event has not arrived (step S1009: NO), the OS 201 advances to the operation at step S905.

The app 1, after receiving the notification that the scheduled starting time has arrived, executes the event _eN (step S1011). When the notification is received, the app 1 may not be standing and may be executing another process. In such a case, for example, the other process may have a priority level that is higher than that of the process of the event _eN. In this case, the app 1 may execute the process of event _eN after the other process is completed.

After the execution of the event _eN, the app 1 determines whether the loop to invoke an event comes to an end (step S1012). If the app 1 determines that the loop to invoke an event continues (step S1012: NO), the app 1 advances to the operation at step S906. If the app 1 determines that the loop to invoke an event comes to an end (step S1012: YES), the app 1 ends the event invoking process that performs the polling correction.

At step S906, "PowerApiLevel_Apl1" is a value specific to the app 1 and does not change during the execution of the app 1. Therefore, in the operation at step S906 executed for the second time or later, the app 1 that advances to the process at step S906 may transmit to the OS 201, only Polling_Apl1 that is the scheduled starting time of the next event and that is used before the correction.

When the OS 201 notifies the app 2 at step S910, the app 2 executes the process instead of the app 1. For example, the app 2 acquires the polling interval T_Apl2 (step S1004) and causes the execution request to be generated for the event _eM by an operation specific to the app 2 (step S1005). The event _eM is registered into the event list 202 by the event management API 222 invoked by the app 2. After this registration, the app 2 stands by until the event _eM is to be executed (step S1006). As with the app 1, at step S1006, if another process is present in addition to the execution of the event _eM, the app 2 may execute the process without standing by.

After receiving notification that the scheduled starting time has arrived, the app 2 executes the event _eM (step S1013), and determines whether the loop to invoke an event comes to an end (step S1014). If the app 2 determines that the loop to invoke an event continues (step S1014: NO), the app 2 advances to the operation at step S907. If the app 2 determines that the loop to invoke an event comes to an end (step S1014: YES), the app 2 causes the event invoking process that performs the polling correction to come to an end.

As described, according to the information processing apparatus, the electrical power control method, and the electrical power control program, the correction is executed such that among the two events to be executed at the current time or thereafter, the interval between the scheduled starting times of the two events is shortened to an extent that a restriction indicated in the restriction information of the event to be corrected is observed. Thus, the execution time periods of the device executed associated with the event process are consolidated, enabling the information processing apparatus to reduce power consumption.

When two preceding events are executed whose processing contents are same as those of the two events and the processing time periods of the two preceding events do not overlap each other, the information processing apparatus may detect the scheduled starting times of the two events to be executed at the current time or thereafter. For example, the processing time periods of the two preceding events may not overlap with each other as a result of limitation of the correctable values imposed by the restriction information. Further, the app that is to execute the corrected event may be currently executing another process whose priority level is higher than that of the event process. Therefore, the app does not always execute the event at the corrected scheduled starting time and the processing time periods of the two events may not overlap with each other.

However, comparing the difference between the scheduled starting times of the two preceding events used before the correction, with the difference between the starting times at which the two preceding events are executed, the latter difference is shorter than the former difference. Therefore, the difference in the scheduled starting times of the two events executed next after the preceding events is smaller than the difference between the scheduled starting times that are of the two preceding events and that are used before the correction. Therefore, the processing time periods tend to overlap with each other. As described, even when the processing time periods of the two events do not overlap with each other, the information processing apparatus executes the stepwise correction and ultimately causes the processing time periods to overlap with each other; and thus, can reduce power consumption.

When the correction of the scheduled starting times of the two preceding events does not result in the processing time periods of the two preceding events overlapping with each other, the information processing apparatus may detect the scheduled starting times of the two events to be executed at the current time or thereafter. The correctable values may be restricted by the restriction information and as a result, it becomes clear at the time of the execution of the correction that the processing time periods of the two preceding events do not overlap with each other. However, the difference between the two events to be executed next after the preceding events is smaller than the difference between the scheduled starting times that are of the two preceding events and that are used before the correction. Therefore, the processing time periods tend to overlap with each other. As described, even when the correction does not result in the processing time periods of the two events overlapping with each other, the information processing apparatus executes the stepwise correction; and thereby, ultimately causes the processing time periods to overlap with each other; and thus, can reduce power consumption.

The information processing apparatus may determine among the two events, the event detected after the other as the event to be corrected. The event detected first, specifically, an event registered in the event list 202 may be already corrected. If the event detected first is determined as the event to be corrected and the correction of the scheduled starting time thereof is executed, a correction that has already been performed is in vain. Therefore, by determining the event that is detected later as the event to be corrected, the information processing apparatus can prevent a correction that has already been performed from being in vain.

The information processing apparatus may detect the event that temporally is to be executed next and another event, among the group of events to be executed at the current time or thereafter, as the two events and may determine the other event as the event to be corrected. Thereby, the information processing apparatus can cause the long-term average of the polling intervals of the event to be corrected to converge to the polling interval used before the correction. The convergence of the long-term average of the polling intervals to the polling interval used before the correction enables the information processing apparatus to easily observe a restriction indicated in the restriction information.

The information processing apparatus may correct the scheduled starting time of the event to be corrected, based on the calculated difference and the power consumption of either one of the two events. For example, the information processing apparatus executes the correction such that the interval between the scheduled starting times of the two events is shorter as the power consumption of event is higher. Thereby, the information processing apparatus can reduce the power consumption of the app that strongly affects the power consumption of the information processing apparatus. When the power consumption of an event is low, the polling interval used before the correction is prioritized and therefore, the information processing apparatus can easily observe a restriction indicated in the restriction information.

The information processing apparatus may correct the scheduled starting time of the event to be corrected, based on the calculated difference and the remaining power level of the information processing apparatus. For example, the information processing apparatus executes the correction such that the interval between the scheduled starting times of the two events becomes shorter as the amount of the remaining power level is lower. Thereby, the information processing apparatus can suppress the consumption of the power when the amount of the remaining power is low. When the amount of the remaining power is high, the polling interval used before the correction is prioritized and therefore, the information processing apparatus can easily observe a restriction indicated in the restriction information.

The electrical power control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to an aspect, reduced power consumption is achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An information processing apparatus comprising
a processor programmed to:
detect scheduled starting times of two events using a device external with the information processing apparatus and to be executed at a current time or thereafter, the two events being registered in an event list;
calculate a difference of the scheduled starting times of the two events, when the scheduled starting times of the two events have been detected;
determine as an event to be corrected, the event detected last among the two events; and
correct, based on the calculated difference and to the extent that the restriction indicated in the restriction information of the event to be corrected is observed, the scheduled starting time of the event to be corrected such that the interval between the scheduled starting times of the two events is shortened; wherein
the processor, from among a group of events to be executed at the current time or thereafter, detects as the two events, an event that temporally is to be executed next among the group of events and another event other than the event that temporally is to be executed next.
2. The information processing apparatus according to claim 1, wherein
the processor detects the scheduled starting times of the two events, when an execution of two preceding events corresponding to the executed two events results in non-overlap of processing time periods of the two preceding events.

3. The information processing apparatus according to claim 1, wherein
the processor detects the scheduled starting times of the two events to be executed at the current time or thereafter, when correction of scheduled starting times of two preceding events results in non-overlap of processing time periods of the two preceding events.

4. The information processing apparatus according to claim 1, wherein
the processor corrects the scheduled starting time of the event to be corrected, based on power consumption of any one among the two events.

5. The information processing apparatus according to claim 1, wherein
the processor corrects the scheduled starting time of the event to be corrected, based on remaining power level of the information processing apparatus.

6. An electrical power control method executed by a computer, the electrical power control method comprising:
detecting scheduled starting times of two events using a device external with the information processing apparatus and to be executed at a current time or thereafter, the two events being registered in an event list;
calculating a difference of the scheduled starting times of the two events, when the scheduled starting times of the two events have been detected;
determining as an event to be corrected, the event detected last among the two events; and
correcting, based on the calculated difference and to the extent that the restriction indicated in the restriction information of the event to be corrected is observed, the scheduled starting time of the event to be corrected such that the interval between the scheduled starting times of the two events is shortened; wherein
the detecting, from among a group of events to be executed at the current time or thereafter, detects as the two events, an event that temporally is to be executed next among the group of events and another event other than the event that temporally is to be executed next.

7. A non-transitory computer-readable recording medium storing an electrical power control program that causes a computer to execute a process, the process comprising:
detecting scheduled starting times of two events using a device external with the information processing apparatus and to be executed at a current time or thereafter, the two events being registered in an event list;
calculating a difference of the scheduled starting times of the two events, when the scheduled starting times of the two events have been detected;
determining as an event to be corrected, the event detected last among the two events; and
correcting, based on the calculated difference and to the extent that the restriction indicated in the restriction information of the event to be corrected is observed, the scheduled starting time of the event to be corrected such that the interval between the scheduled starting times of the two events is shortened; wherein
the detecting, from among a group of events to be executed at the current time or thereafter, detects as the two events, an event that temporally is to be executed next among the group of events and another event other than the event that temporally is to be executed next.

* * * * *